United States Patent
Arora et al.

(10) Patent No.: US 11,562,401 B2
(45) Date of Patent: Jan. 24, 2023

(54) METHODS AND APPARATUS FOR AUTOMATICALLY PROVIDING DIGITAL ADVERTISEMENTS

(71) Applicant: Walmart Apollo, LLC, Bentonville, AR (US)

(72) Inventors: Yokila Arora, Sunnyvale, CA (US); Aditya Mantha, Sunnyvale, CA (US); Praveenkumar Kanumala, Newark, CA (US); Stephen Dean Guo, Saratoga, CA (US); Kannan Achan, Saratoga, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 131 days.

(21) Appl. No.: 16/455,274

(22) Filed: Jun. 27, 2019

(65) Prior Publication Data
US 2020/0410546 A1  Dec. 31, 2020

(51) Int. Cl.
*G06Q 30/02* (2012.01)
*G06N 3/08* (2006.01)
*G06Q 30/06* (2012.01)

(52) U.S. Cl.
CPC .......... *G06Q 30/0271* (2013.01); *G06N 3/08* (2013.01); *G06Q 30/0255* (2013.01); *G06Q 30/0277* (2013.01); *G06Q 30/0631* (2013.01)

(58) Field of Classification Search
None
See application file for complete search history.

(56) References Cited

U.S. PATENT DOCUMENTS

| | | | |
|---|---|---|---|
| 6,219,679 B1 | 4/2001 | Brisebois et al. |
| 8,468,083 B1 | 6/2013 | Szulezewski |
| 10,204,356 B2 | 2/2019 | Ferber et al. |
| 10,248,971 B2 | 4/2019 | Varley |

(Continued)

OTHER PUBLICATIONS

F. Teschner. Concatenate Embeddings for Categorical Variables with Keras. [retrieved from archive on Jul. 13, 2022, archived on Dec. 21, 2018] <URL: https://web.archive.org/web/20181221194230/http://flow.github.io/Embeddings_with_keras_part2/> (Year: 2018).*

(Continued)

*Primary Examiner* — Bion A Shelden
(74) *Attorney, Agent, or Firm* — Morgan, Lewis & Bockius LLP; Manita Rawat

(57) ABSTRACT

This application relates to apparatus and methods for automatically determining and providing digital advertisements to targeted users. In some examples, a computing device receives campaign data identifying items to advertise on a website, and generates campaign user data identifying a user that has engaged all of the items on the website. The computing device may then determine a portion of the users based on a relationship between each user and the campaign user data, and may determine user-item values for each of the items for each user of the portion of users, where each user-item value identifies a relational value between the corresponding user and item. The computing device may then identify one or more of the items to advertise to each user of the portion of users based on the user-item values, and may transmit to a web server an indication of the items to advertise for each user.

19 Claims, 8 Drawing Sheets

(56) References Cited

U.S. PATENT DOCUMENTS

| | | | |
|---|---|---|---|
| 10,740,825 B1* | 8/2020 | Zhang | G06F 16/24575 |
| 10,932,003 B2* | 2/2021 | Volkovs | G06F 16/9535 |
| 2002/0023000 A1 | 2/2002 | Bollay | |
| 2002/0143636 A1 | 10/2002 | Carignani | |
| 2003/0229900 A1 | 12/2003 | Reisman | |
| 2009/0024470 A1 | 1/2009 | Mandelson et al. | |
| 2009/0271433 A1* | 10/2009 | Perronnin | G06F 17/16 |
| 2012/0054040 A1* | 3/2012 | Bagherjeiran | G06Q 30/0255 |
| | | | 705/14.66 |
| 2012/0259702 A1 | 10/2012 | Zhang et al. | |
| 2013/0124298 A1* | 5/2013 | Li | G06Q 30/0241 |
| | | | 705/14.42 |
| 2013/0304566 A1 | 11/2013 | Choi et al. | |
| 2014/0257980 A1 | 9/2014 | Yin et al. | |
| 2015/0006280 A1 | 1/2015 | Ruiz et al. | |
| 2016/0189234 A1 | 6/2016 | Tang et al. | |
| 2016/0191639 A1* | 6/2016 | Dai | G06Q 30/0267 |
| | | | 709/204 |
| 2016/0343027 A1* | 11/2016 | Cheng | H04L 12/185 |
| 2017/0091805 A1 | 3/2017 | Tu et al. | |
| 2017/0132509 A1* | 5/2017 | Li | G06N 3/0454 |
| 2018/0005271 A1 | 1/2018 | He et al. | |
| 2018/0157663 A1* | 6/2018 | Kapoor | G06Q 30/0201 |
| 2018/0253800 A1 | 9/2018 | Feldman et al. | |
| 2018/0268317 A1* | 9/2018 | Dharwadker | G06F 16/24578 |
| 2018/0276542 A1* | 9/2018 | Cheng | G06Q 30/02 |
| 2018/0329928 A1* | 11/2018 | Gupta | G06V 20/40 |
| 2019/0163801 A1* | 5/2019 | Lerer | G06F 16/27 |
| 2019/0251435 A1* | 8/2019 | Shiebler | G06N 3/082 |
| 2019/0325482 A1 | 10/2019 | Varley | |
| 2019/0355011 A1* | 11/2019 | Pustejovsky | G06Q 30/0244 |
| 2019/0370854 A1* | 12/2019 | Gao | H04L 67/22 |
| 2019/0370879 A1* | 12/2019 | Bhattacharjee | G06N 20/00 |
| 2020/0107072 A1 | 4/2020 | Lomada et al. | |
| 2020/0134034 A1* | 4/2020 | Zhao | G06F 16/56 |
| 2020/0134663 A1 | 4/2020 | Gao et al. | |
| 2020/0184515 A1* | 6/2020 | deWet | G06Q 30/0254 |
| 2020/0193511 A1* | 6/2020 | Saito | G06N 3/08 |

OTHER PUBLICATIONS

J Zhao et al. "Collaborative Deep Denoising Autoencoder Framework for Recommendations" 2019. [retrieved from internet on Nov. 1, 2022] <URL: https://assets.amazon.science/8b/0b/849c96bb44e4916cd98a952dfc41/collaborative-denoising-auto-encoders-for-top-n-recommender-systems.pdf> (Year: 2019).*
Karp et al., "An Optimal Algorithm for On-line Bipartite Matching", STOC 1990, pp. 352-358.
Mehta et al., "AdWords and Generalized On-line Matching", J. ACM 54(5): 22 (2007).
Chen et al., "Conflict-Aware Weighted Bipartite B-Matching and Its Application to E-Commerce", IEEE Trans. Knowl. Data Eng. 28(6) 2016, pp. 1475-1488.
Robinson, "Computer Scientists Optimize Innovative Ad Auction", SIAM News, vol. 38, No. 3, Apr. 2005.
Aharon et al., "Carousel Ads Optimization in Yahoo Gemini Native", KDD 2019, pp. 1993-2001.
Mehta, "Online Matching and Ad Allocation", Foundations and Trends in Theoretical Computer Science, 8(4) 2013, pp. 265-368.
Agarwal et al., "Constrained Optimization for Homepage Relevance", WWW (Companion Volume) 2015, pp. 375-384.
Bansal et al., "Correlation Clustering", Machine Learning 56(1-3) 2004, pp. 89-113.

* cited by examiner

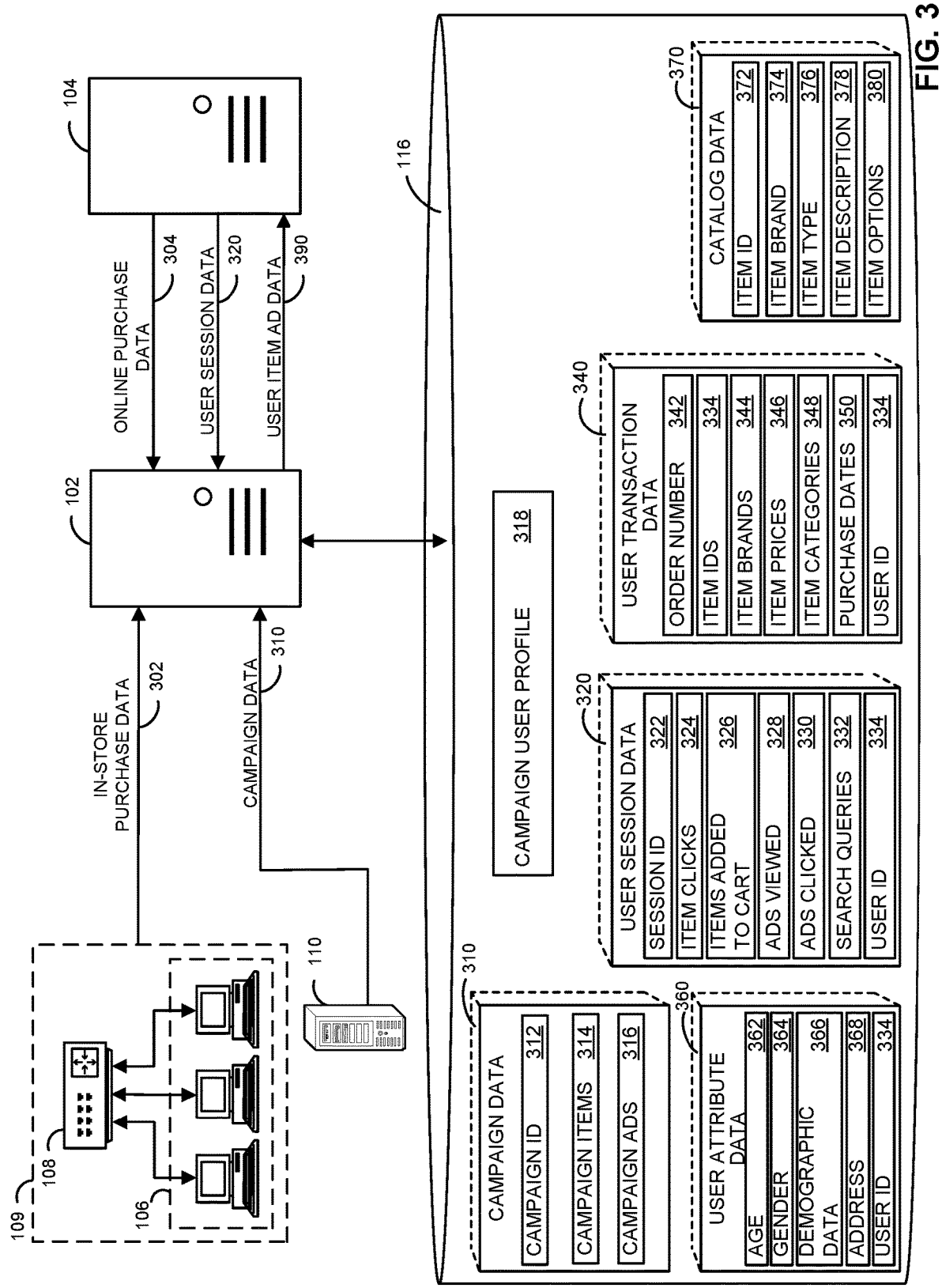

METHODS AND APPARATUS FOR AUTOMATICALLY PROVIDING DIGITAL ADVERTISEMENTS

TECHNICAL FIELD

The disclosure relates generally to digital advertising and, more specifically, to automatically determining and providing digital advertisements.

BACKGROUND

An advertisement may be a presentation or communication to promote an item, such as a product or service, for purchase. At least some advertisements are digital advertisements, which include a digital representation of the presentation or communication, such as one displayed on a web site. A sponsor of an advertisement, such as a business, may seek to sell the item in the advertisement. The sponsor may advertise the item in the advertisement to notify potential buyers of the sale of the item, thereby increasing the chances of selling the item. For example, the sponsor may advertise the item on a website, such as a retailer's website. In at least some examples, the advertisement may be part of an advertising campaign that identifies one or more products to promote on the website.

At least some sponsors of digital advertisements pay a fee to have an item advertised. For example, some sponsors of advertisements pay a fee to a retailer to advertise a sponsor's item on the retailer's web site, or through an advertising campaign. The amount of the fee may depend on a number of user interactions, such as user clicks or views, the item advertisement receives. In addition, at least some retailer websites allow a customer to purchase the item advertised, allowing the retailer to profit from the sold item. However, items advertised on a retailer's website, such as via an advertising campaign, may not be of interest to all customers. For example, not all customers are interested in the same item. As such, it is beneficial to a retailer to provide customers with advertisements of item that interest those customers such that they are more likely to interact with the item advertisement or purchase the advertised item.

SUMMARY

The embodiments described herein are directed to automatically providing advertisements, such as, for example, digital advertisements, on a website. The embodiments may select and provide a digital advertisement to a customer with which the customer is more likely to interact. For example, the embodiments may select digital advertisements for items that a particular customer is more likely to purchase, thereby personalizing the digital advertisements to each customer. As a result, the embodiments may allow a retailer to increase the amount of fees collected from advertisers (e.g., increase digital advertisement revenue), as well as from item sales, among other advantages. For example, other advantages may be recognized by those of ordinary skill in the art having the benefit of these disclosures.

In accordance with various embodiments, exemplary systems may be implemented in any suitable hardware or hardware and software, such as in any suitable computing device. For example, in some embodiments, a computing device is configured to receive campaign data identifying a first plurality of items. The computing device may generate first user data based on the first plurality of items, where the first user data identifies a first user that has engaged the first plurality of items. For example, the computing device generates a first user profile with the assumption that the first user has purchased the first plurality of items. The computing device may also obtain attribute data identifying at least one attribute of each of a plurality of users. The computing device may then determine a portion of the plurality of users based on application of a nearest neighbor algorithm to the first user data and the attribute data.

In some examples, the computing device determines at least one attribute value for at least one attribute of a second plurality of items for each of the plurality of the users, and generates user representation data for each user of the plurality of users based on application of a neural network to the at least one attribute value and the attribute data corresponding to each user of the plurality of users. In some of these examples, the computing device determines the portion of the plurality of users based on application of a nearest neighbor algorithm to the first user data and the user representation data.

The portion of the plurality of users are candidate users that may be selected to view an advertisement of one or more of the first plurality of items, for example. The computing device may also determine user-item values for each of the first plurality of items for each of the candidate users, where each user-item value identifies a relational value between the corresponding user and item. The computing device may determine at least one of the first plurality of items for each user of the portion of the plurality of users based on the user-item values, which may then be advertised to each corresponding user. In some examples, the computing device ranks the first plurality of items, which are then advertised to each corresponding user according to the ranking.

In some embodiments, a method is provided that includes receiving campaign data identifying a first plurality of items. The method includes generating first user data based on the first plurality of items, where the first user data identifies a first user that has engaged the first plurality of items. The method may also include obtaining attribute data identifying at least one attribute of each of a plurality of users, and determining a portion of the plurality of users based on application of a nearest neighbor algorithm to the first user data and the attribute data.

In some examples, the method includes determining at least one attribute value for at least one attribute of a second plurality of items for each of the plurality of the users, and generating user representation data for each user of the plurality of users based on application of a neural network to the at least one attribute value and the attribute data corresponding to each user of the plurality of users. In some of these examples, the method includes determining the portion of the plurality of users based on application of a nearest neighbor algorithm to the first user data and the user representation data.

The method may also include determining user-item values for each of the first plurality of items for each of the candidate users, where each user-item value identifies a relational value between the corresponding user and item. The method may include determining at least one of the first plurality of items for each user of the portion of the plurality of users based on the user-item values, which may then be advertised to each corresponding user. In some examples, the method includes ranking the first plurality of items, which are then advertised to each corresponding user according to the ranking.

In yet other embodiments, a non-transitory computer readable medium has instructions stored thereon, where the instructions, when executed by at least one processor, cause a computing device to perform operations that include receiving campaign data identifying a first plurality of items. The operations include generating first user data based on the first plurality of items, where the first user data identifies a first user that has engaged the first plurality of items. The operations may also include obtaining attribute data identifying at least one attribute of each of a plurality of users, and determining a portion of the plurality of users based on application of a nearest neighbor algorithm to the first user data and the attribute data.

In some examples, the operations include determining at least one attribute value for at least one attribute of a second plurality of items for each of the plurality of the users, and generating user representation data for each user of the plurality of users based on application of a neural network to the at least one attribute value and the attribute data corresponding to each user of the plurality of users. In some of these examples, the operations include determining the portion of the plurality of users based on application of a nearest neighbor algorithm to the first user data and the user representation data.

The operations may also include determining user-item values for each of the first plurality of items for each of the candidate users, where each user-item value identifies a relational value between the corresponding user and item. The operations may include determining at least one of the first plurality of items for each user of the portion of the plurality of users based on the user-item values, which may then be advertised to each corresponding user. In some examples, the operations include ranking the first plurality of items, which are then advertised to each corresponding user according to the ranking.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein:

FIG. 3 is a block diagram illustrating examples of various portions of the digital advertisement identification system of FIG. 1 in accordance with some embodiments;

DETAILED DESCRIPTION

Figure 1:
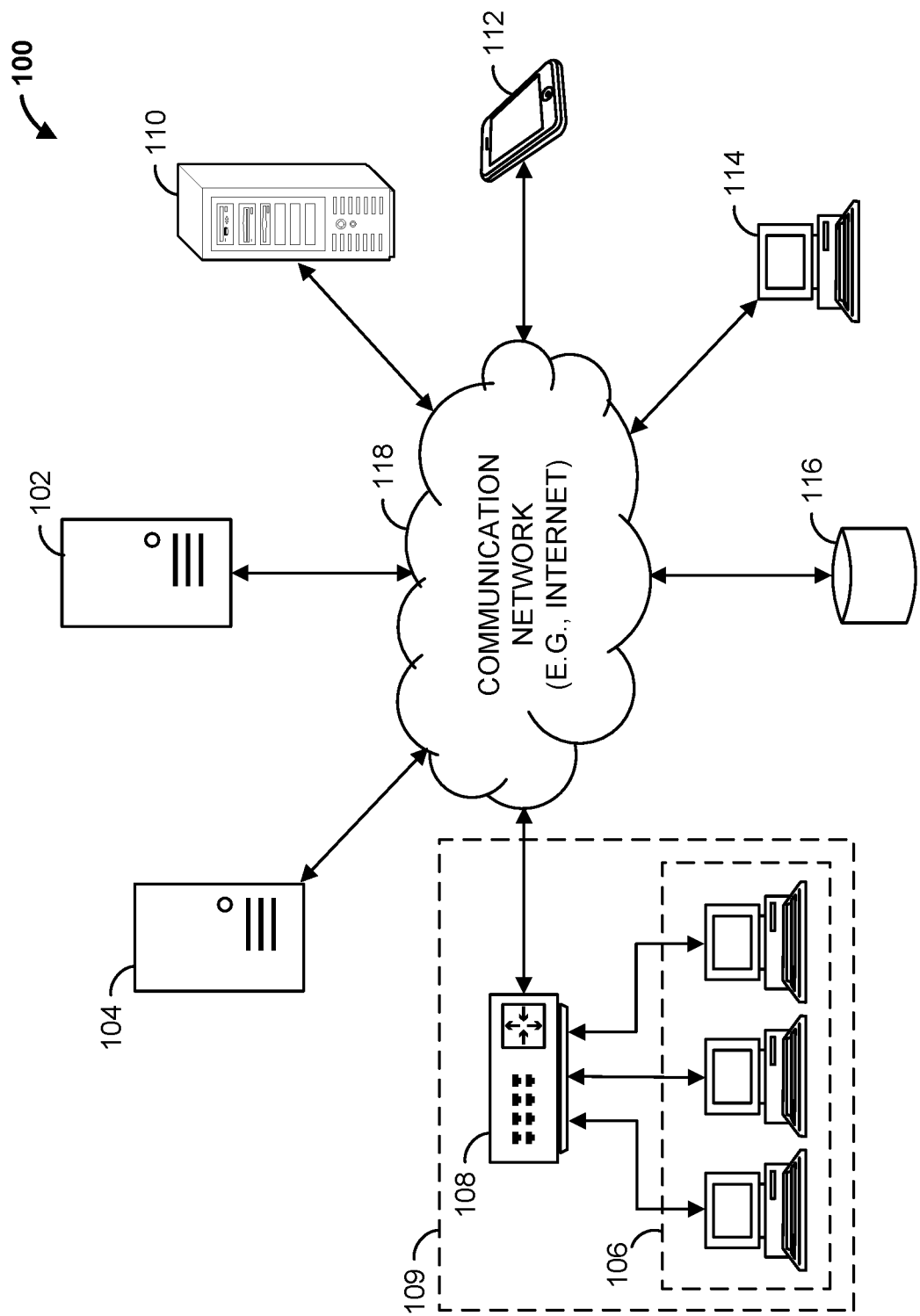
FIG. 1 is a block diagram of a digital advertisement identification system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Turning to the drawings, FIG. 1 illustrates a block diagram of a digital advertisement identification system 100 that includes a digital advertisement computing device 102 (e.g., a server, such as an application server), a server 104 (e.g., a web server), workstation(s) 106, database 116, campaign data server 110, and multiple customer computing devices 112, 114 operatively coupled over network 118. Digital advertisement computing device 102, workstation(s) 106, server 104, campaign data server 110, and multiple customer computing devices 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, communication network 118.

In some examples, digital advertisement computing device 102 and campaign data server 110 can be a computer, a workstation, a laptop, a server such as a cloud-based server, or any other suitable device. In some examples, each of multiple customer computing devices 112, 114 can be a cellular phone, a smart phone, a tablet, a personal assistant device, a voice assistant device, a digital assistant, a laptop, a computer, or any other suitable device. In some examples, digital advertisement computing device 102 is operated by a retailer, campaign data server 110 is operated by a third party, such as a manufacturer of products, and multiple customer computing devices 112, 114 are operated by customers of the retailer.

Although FIG. 1 illustrates two customer computing devices 112, 114, digital advertisement identification system 100 can include any number of customer computing devices 110, 112, 114. Similarly, digital advertisement identification system 100 can include any number of workstation(s) 106, digital advertisement computing devices 102, campaign data servers 110, servers 104, and databases 116.

Workstation(s) 106 are operably coupled to communication network 118 via router (or switch) 108. Workstation(s) 106 and/or router 108 may be located at a store 109, for example. Workstation(s) 106 can communicate with digital advertisement computing device 102 over communication network 118. The workstation(s) 106 may send data to, and receive data from, digital advertisement computing device 102. For example, the workstation(s) 106 may transmit data related to an order purchased by a customer at store 109 to digital advertisement computing device 102. In response, digital advertisement computing device 102 may transmit an indication of one or more items to advertise or promote to the purchasing customer. For example, the items may be displayed on a receipt handed to the customer for the purchase order.

In some examples, server 104 may be a web server and host one or more web pages, such as a retailer's website. Web server 104 may transmit data related to an order purchased on the website by a customer to digital advertisement computing device 102. In response, digital advertisement computing device 102 may transmit an indication of one or more items to advertise or promote on the website to the purchasing customer. For example, the items may be displayed on the homepage of the website when the customer is browsing the website.

First customer computing device 112, and $N^{th}$ customer computing device 114 may communicate with web server 104 over communication network 118. For example, each of multiple computing devices 112, 114 may be operable to view, access, and interact with webpages hosted by web server 104. In some examples, web server 104 hosts a web page for a retailer that allows for the purchase of items. For example, the web page may list prices for advertised items. An operator of one of multiple computing devices 112, 114 may access the web page hosted by web server 104, add one or more items to an online shopping cart of the web page, and perform an online checkout of the shopping cart to purchase the items.

Digital advertisement computing device 102 is operable to communicate with database 116 over communication network 118. For example, digital advertisement computing device 102 can store data to, and read data from, database 116. Database 116 can be a remote storage device, such as a cloud-based server, a memory device on another application server, a networked computer, or any other suitable remote storage. Although shown remote to digital advertisement computing device 102, in some examples, database 116 can be a local storage device, such as a hard drive, a non-volatile memory, or a USB stick.

Communication network 118 can be a WiFi network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

Digital advertisement computing device 102 may generate, for each customer, a ranking of digital advertisements, such as digital advertisements of an advertising campaign, that may be displayed on a web page, such as a web page hosted by web server 104. For example, given a pool of products to promote in a campaign, digital advertisement computing device 102 may identify (e.g., select) a set of customers that may be more likely to be interested in the promoted products. For each of the customers, digital advertisement computing device 102 may generate a personalized ranking of the promotional products. Based on the ranking, the promotional products may be advertised accordingly to each customer. The promoted products may be displayed, for example, as recommended items on a web page of a retailer's website hosted by web server 104. As a result, each customer may see more relevant advertisements when viewing the corresponding web pages.

In one example, digital advertisement computing device 102 employs a recommender system (or "recommendation system," as is known in the art), to predict a rating for the promoted items. For example, digital advertisement computing device 102 may employ a recommender system, such as one based on collaborative filtering, that generates user-item affinity scores for each promoted item for each customer. The recommender system may generate user-item affinity scores based on past item engagement activity for each user. For example, web server 104 may store data related to what items a customer has engaged (e.g., clicked on, viewed, added to cart, etc.) during past browsing sessions. Digital advertisement computing device 102 may employ the recommender system to generate user-item affinity scores for each customer based on the stored data. For each promoted item, the recommender system may generate a user-item affinity score for that particular customer. If the user-item affinity score for a particular promotional item is above a minimum threshold, digital advertisement computing device 102 may store an indication that the particular promotional item is to be advertised to the customer. For example, digital advertisement computing device 102 may store data identifying and characterizing the digital advertisement in database 116. Web server 104 may then obtain the stored data, and display the digital advertisement to the customer, for example, when the customer browses the retailer's website.

In some examples, digital advertisement computing device 102 receives campaign data from campaign data server 110 identifying and characterizing a plurality of items to promote. Digital advertisement computing device 102 may, for each of a plurality of customers, generate user-item affinity scores for each promotional item based on execution of a recommender system. Digital advertisement computing device 102 may then determine how many user-item affinity scores for the promotional items of the campaign are above a first minimum threshold. If the number of user-item affinity scores above the first minimum threshold is above a second minimum threshold, digital advertisement computing device 102 determines that the campaign (i.e., advertisements for the items being promoted in the campaign) be displayed to the customer. For example, the campaign may only be shown to those customers that have at least the second minimum threshold number of user-item affinity scores above the first threshold.

In some examples, digital advertisement computing device 102 generates product embeddings for a plurality of items, where each product embedding identifies one or more attributes of an item. For example, a product embedding for an item may identify and characterize a brand, a description, or any other attribute of the item. Each product embedding may be represented by a product embedding vector, where each element of the product embedding vector identifies a value for a particular attribute of the corresponding item. Digital advertisement computing device 102 may generate the product embeddings based on user session data, where the user session data identifies one or more item engagements, such as on a website. For example, user session data for a user may identify that an item was added to an online shopping cart, that an item (e.g., item advertisement) was clicked on, that an item was viewed (e.g., an advertisement for the item was viewed), or that an item was searched for (e.g., via a search bar on the website). Digital advertisement computing device 102 may generate product embeddings for one or more items identified by the user session data. For example, based on user session data, digital advertisement computing device 102 may identify a sequence of items $w_1, w_2, w_3, \ldots, w_T$ (e.g., the sequence of items may have been clicked on by a user during a browsing session of the website). To generate the product embeddings for these items, digital advertisement computing device 102 may maximize an average log probability according to the equation below:

$$\frac{1}{T}\sum_{t=1}^{T}\sum_{-c\leq j\leq c, j\neq 0} \log p(w_{t+j}|w_t) \qquad \text{(eq. 1)}$$

where:
- c=length of the context (e.g., c-sized window of words surrounding $w_t$);
- T=total number of words/items in the sequence;

In some examples, the term $p(w_{t+j}|w_t)$ is defined by a softmax function, such as one according to the equation below:

$$p(w_O|w_I) = \frac{\exp(v'_{w_O}{}^T v_{w_I})}{\sum_{w=1}^{W}\exp(v'_{w}{}^T v_{w_I})} \qquad \text{(eq. 2)}$$

where:
- $v'_{w_O}$=output representations of words (e.g., output product embeddings);
- $v_{w_I}$=input representations of words (e.g., input product embeddings);
- W=vocabulary size;

In some examples, digital advertisement computing device 102 generates the product embeddings based on user transaction data, where the user transaction data identifies one or more purchased items and corresponding attributes, such as items purchased at store 109 or on online (e.g., a website hosted by web server 104). In some examples, the product embeddings are based on a combination of user session data and user transaction data. For example, for each user, and for a list of items associated with the user (e.g., items based on user transaction data) product embeddings generated for those items (e.g., using equation (2) above) are averaged. In some examples, product embeddings of variable length are combined into a fixed width vector representing the averaged product embeddings.

Digital advertisement computing device 102 may then determine a value for each attribute of the items based on the product embeddings for the items (e.g., sequence of items $w_1, w_2, w_3, \ldots, w_t$). For example, digital advertisement computing device 102 may average each the product embeddings for similar attributes of the items to determine a product embedding average vector, where each element of the product embedding average vector identifies an average value for a particular attribute. This allows, for example, a variable number of items (e.g., $w_t$ items) to be represented by a fixed width vector.

In some examples, digital advertisement computing device 102 combines the product average vector with user attribute data representing one or more user attributes to generate a user vector. User attributes may include, for example, an age, gender, address, demographic information, or any other user attributes. As such, each user vector identifies product embeddings based on user session data of a particular user, and user attributes of the same particular user.

Digital advertisement computing device 102 may then generate user embeddings, which identify one or more features, such as latent features, based on application of a neural network to the user vectors. For example, digital advertisement computing device 102 may apply a stacked denoising auto-encoder to the user vectors to generate the user embeddings. The user embeddings may represent a lower dimensional representation of the user vector.

In some examples, digital advertisement computing device 102 trains the neural network with user vectors generated from a plurality of users. The neural network may be trained with noisy user vectors, and may be performed by minimizing the loss between the output of the neural network and the input of the neural network. For example, the training may be performed such that the least squared loss identified by the equation below is minimized.

$$\|x-y\|_2^2 \qquad \text{(eq. 3)}$$

where:
- x=input to neural network;
- y=output from neural network;

In some examples, digital advertisement computing device 102 trains a stacked denoising auto-encoder, which includes one or more encoder layers and one or more decoder layers, with noisy user vectors, minimizing the least squared loss between the stacked denoising auto-encoder's output and input. After training, digital advertisement computing device 102 employs only the encoder layer(s) to generate user embeddings.

Digital advertisement computing device 102 may generate user embeddings for a plurality of users, such as users with user session data or user transaction data identifying activity over a previous period (e.g., over the past month, year, etc.). Digital advertisement computing device 102 may then determine a subset of the plurality of users (herein referred to as "candidate users") to which particular item advertisements may be shown.

For example, digital advertisement computing device 102 may obtain campaign data from campaign data server 110 identifying one or more items to be promoted with a particular advertising campaign. Based on the campaign data, digital advertisement computing device 102 generates a campaign user, defined to be a user who has engaged one or more of the promotional items. For example, the campaign user may be one who has purchased all of the items promoted in the advertising campaign. Digital advertisement computing device 102 may generate a campaign user profile for the campaign user based on the attributes for the promotional items. For example, digital advertisement computing device 102 may generate a campaign user average vector identifying and characterizing the campaign user based on the product embeddings for each of the promotional items, similar to the product user embedding average vector discussed above. In some examples, user attributes are also assumed for the campaign user. For example, the campaign user may be assigned an age attribute, where the age of the campaign user is an average age of all customers. Similarly, other user attributes may be assigned.

To determine the candidate users, digital advertisement computing device 102 may determine a subset of the plurality of users represented by the generated user embeddings that are most similar (e.g., closest) to the campaign user. For example, digital advertisement computing device 102 may employ a nearest neighbor algorithm, such as an approximate nearest neighbor (ANN) algorithm identified by the equation below, to identify the candidate users.

$$d(p_i, q) \leq c \cdot \min_{p_j} d(p_j, q) \qquad \text{(eq. 4)}$$

where:
- q is the query point;
- $d(p_i,q)$ is the distance from the query point q to the point $p_i$;
- $p_i$, $p_j$=any two points in a set P, where P={$p_1$, $p_2$, ..., $p_n$}

The ANN algorithm finds the approximate set of points whose distance is at most c times the distance from the query point q to its nearest points. In some examples, the required maximum distance is a predetermined distance. In some examples, an algorithm such as a k-nearest neighbors, locality-sensitivity hashing, best bin first, or kd-trees algorithm may be employed to determine the candidate users.

In some examples, the identified candidate users are shown one or more of the promoted items. For example, digital advertisement computing device 102 may transmit the candidate users to web server 104. Web server 104 may detect when a user corresponding to one of the candidate users is browsing a website hosted by web server 104, and may cause one or more of the promoted items of the advertising campaign to be displayed to the user.

In some examples, digital advertisement computing device 102 ranks the promoted items of the advertising campaign for each user, and web server 104 displays the items to each candidate user based on their personalized ranking of the promoted items. Digital advertisement computing device 102 may determine a ranking of the promoted items for each candidate user based on user-item affinity scores. For example, user-item affinity scores may be generated for all items in a catalog, but the ranked list may contain user-item affinity scores only for the promoted items. The promoted items may be displayed on a website to each user.

In some examples, the user-item affinity scores are generated based on a recommender system, as discussed above. For example, digital advertisement computing device 102 may employ a recommender system to generate user-item affinity scores for the promoted items. Promoted items with higher user-item affinity scores are then ranked higher than those with lower user-item affinity scores. Web server 104 may then display one or more of the promoted items to the corresponding candidate user based on the ranking. For example, web server 104 may display a number of recommended item advertisements, such as three, at a time, and in accordance with the ranking.

In some examples, digital advertisement computing device 102 may employ a matrix decomposition method, such as singular value decomposition (SVD) or singular value decomposition++(SVD++), to determine the user-item affinity scores. For example, digital advertisement computing device 102 may generate user-item affinity scores in accordance with the SVD equation identified below.

$$\hat{r}_{ui} = b_{ui} + p_u^T q_i \qquad \text{(eq. 5)}$$

where:
- $\hat{r}_{ui}$=user-item affinity score;
- $b_{ui}=\mu+b_u+b_i$, and represents the bias added;
- $p_u$=user factor, represented by a vector;
- $q_i$=item factor;
- T=transpose of the vector $p_u$ The user factor $p_u$ and item factor $q_i$ may be determined by a minimizing loss function operating on user transaction data. For example, the factors may be determined by the loss function given below, which minimizes the difference between the actual user-item interaction value ($r_{ui}$) from the user transaction data and predicted user-item interaction value ($\hat{r}_{ui}$) through gradient descent. Once training is complete, the user and item factors can be used to obtain the user-item affinity scores for all (user, item) pairs.

$$\min \Sigma_{\forall u,i}(r_{ui}-\hat{r}_{ui})^2 \qquad \text{(eq. 7)}$$

where:
- $r_{ui}$=number of times a user 'u' purchased item 'i';
- $\hat{r}_{ui}$=predicted user-item affinity score;

As another example, digital advertisement computing device 102 may generate user-item affinity scores in accordance with the SVD++ equation identified below.

$$\hat{r}_{ui} = b_{ui} + q_i^T \left( p_u + |N(u)|^{-\frac{1}{2}} \sum_{j \in N(u)} y_j \right) \qquad \text{(eq. 6)}$$

where:
- N(u)=number of times a user 'u' purchased item 'i';
- $y_j$ signifies implicit feedback (for example product ratings);

Digital advertisement computing device 102 may then determine the ranking of the promoted items for each candidate user based on the user-item affinity scores. For example, digital advertisement computing device 102 may rank promoted items with higher user-item affinity scores higher than those with lower user-item affinity scores. Web server 104 may then display one or more of the promoted items on a website to the corresponding candidate user when that candidate user is browsing the website.

In some examples, when a user is purchasing items at store 109, a message is transmitted to digital advertisement computing device 102 requesting recommended items for one or more campaigns for that user. In response, Digital advertisement computing device 102 may transmit a message identifying one or more recommended items based on the user-item affinity scores for that user for the requested campaign, and the one or more recommended items may be advertised in a receipt given to the user at store 109.

In some examples, digital advertisement computing device 102 generates and transmits communication messages, such as emails, and SMS (e.g., texts) messages, advertising the recommended items to the candidate users based on each user's personalized item ranking. The communication messages may be transmitted to a customer computing device 112, 114 associated with the candidate user, for example. In yet other examples, digital advertisement computing device 102 may personalize searches, such as website searches, conducted on a website hosted by web server 104 based on item rankings. For example, a candidate user may conduct a search on the website, and web server 104 may transmit a message to digital advertisement computing device 102 with the search request. Based on the search request, digital advertisement computing device may determine user item affinity scores for items related to the search, and determine item rankings for those items. Digital advertisement computing device 102 may then transmit the item rankings to web server 104, and web server 104 may display one or more of the ranked items according to the item ranking.

Figure 2:
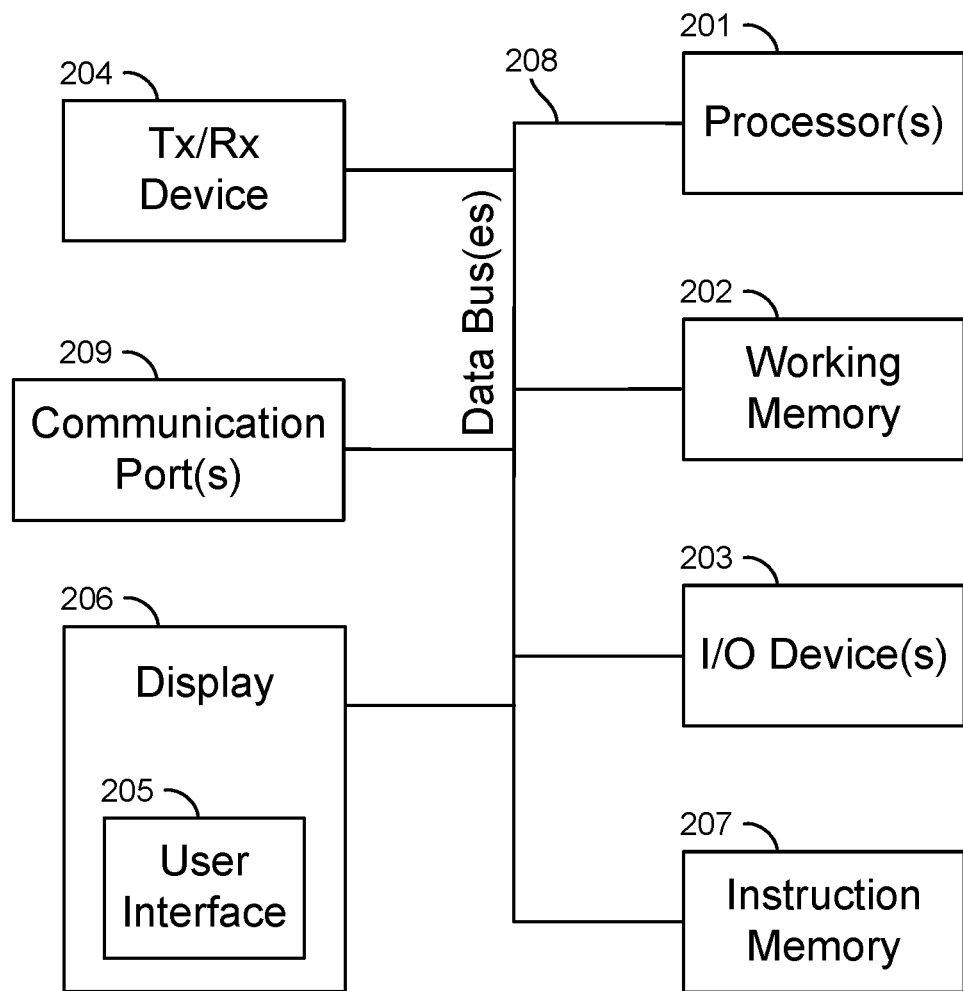
FIG. 2 is a block diagram of the digital advertisement computing device of the digital advertisement identification system of FIG. 1 in accordance with some embodiments.

FIG. 2 illustrates the digital advertisement computing device 102 of FIG. 1. Digital advertisement computing device 102 can include one or more processors 201, working memory 202, one or more input/output devices 203, instruction memory 207, a transceiver 204, one or more communication ports 209, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of digital advertisement computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions in instruction memory 207. In some examples, communication port(s) 209 allows for the transfer (e.g., uploading or downloading) of data, such as machine learning algorithm training data.

Display 206 can display user interface 205. User interfaces 205 can enable user interaction with digital advertisement computing device 102. For example, user interface 205 can be a user interface for an application of a retailer that allows a customer to view and interact with a retailer's webpage. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 digital advertisement computing device 102 will be operating in. Processor(s) 201 is operable to receive data from, or send data to, a network, such as communication network 118 of FIG. 1, via transceiver 204.

FIG. 3 is a block diagram illustrating examples of various portions of the digital advertisement identification system 100 of FIG. 1. As indicated in the figure, database 116 stores user attribute data 360, user session data 320, and user transaction data 340. User attribute data 360 may include, for each user of a plurality of users, an age 362, gender 364, demographic data 366, address 368 (or other contact information, such as email address, phone number, etc.), and a user ID 334 (e.g., a customer ID, retailer website login ID, etc.).

Digital advertisement computing device 102 may receive user session data 320 from web server 104 and may identify, for each user, data related to a browsing session, such as when browsing a retailer's webpage hosted by web server 104. In this example, user session data 320 may include a session ID 322, item clicks 324 identifying items which the user clicked, items added-to-cart 326 identifying items added to the user's online shopping cart, advertisements viewed 328 identifying advertisements the user viewed during the browsing session, advertisements clicked 330 identifying advertisements the user clicked on, search queries 332 identifying one or more searches conducted by the user during the browsing session, and user ID 334.

Digital advertisement computing device 102 may receive in-store purchase data 302 identifying and characterizing one or more purchases from one or more stores 109. Similarly, digital advertisement computing device 102 may receive online purchase data 304 from web server 104, which identifies and characterizes one or more online purchases, such as from a retailer's website. Digital advertisement computing device 102 may parse in-store purchase data 302 and online purchase data 304 to generate user transaction data 340.

User transaction data 340 may identify, for each user, data related to previous transactions, such as in-store or online purchases. In this example, user transaction data 340 includes an order number 342 identifying a purchase order, item IDs 334 identifying one or more items purchased in the purchase order, item brands 344 identifying a brand for each item purchased, item prices 346 identifying the price of each item purchased, item categories 348 identifying one or more categories of each item purchased, a purchase date 350 identifying the purchase date of the purchase order, and user ID 334 for the user making the corresponding purchase.

Database 116 also stores catalog data 370, which may identify one or more attributes of a plurality of items, such as a portion of or all items a retailer carries. Catalog data 370 may identify, for each of the plurality of items, an item ID 372 (e.g., an SKU number), item brand 374, item type 376 (e.g., grocery item such as milk, clothing item), item description 378 (e.g., a description of the product including product features, such as ingredients, benefits, use or consumption instructions, or any other suitable description), and item options 380 (e.g., item colors, sizes, flavors, etc.).

Based on user session data 320, digital advertisement computing device 102 may generate product embeddings for each of a plurality of items. For example, digital advertisement computing device 102 may determine one or more items based on user session data 320 (e.g., items corresponding to user session data 320, such as items corresponding to item clicks 324). Digital advertisement computing device 102 may then obtain catalog data 370 corresponding to each determined item to determine one or more attributes for the item, such as item brand 374 and item description 378. Digital advertisement computing device 102 may then generate a product embedding vector based on the attributes for the item, for example, in accordance with equations (1) and (2) above. For each user, digital advertisement computing device 102 may then average the product embedding vectors to generate a product embedding average vector for each user. Digital advertisement computing device 102 may concatenate the product embedding average vector with one or more user attributes identified by user attribute data 360, such as age 362 and gender 364, to generate a user vector for each user of the plurality of users.

Digital advertisement computing device 102 may apply a neural network, such as a stacked denoising auto-encoder, to the generated user vectors, to generate user embeddings, which in some examples may identify lower dimensional representations of the user vectors.

Digital advertisement computing device 102 may also obtain campaign data 310 from campaign data server 110. Campaign data 310 may identify one or more items to promote for an advertising campaign. Digital advertisement computing device 102 may store campaign data in database 116. Campaign data may include, for example, a campaign identification (ID) 312 identifying an advertising campaign, campaign items 314 identifying one or more items to promote, and campaign advertisements (ADs) 316 identifying one or more corresponding advertisements for the campaign items 314.

Digital advertisement computing device 102 may generate a campaign user profile 318 based on the campaign items 314 to promote for campaign ID 312. For example, digital advertisement computing device 102 may obtain catalog data 370 corresponding to each promotional item to determine one or more attributes for each item, and may determine the campaign user profile 318 for campaign ID 312 based on the attributes of all of the items being promoted. Digital advertisement computing device 102 may store the campaign user profile 318 in database 116.

Digital advertisement computing device 102 may then determine one or more candidate users based on the user embeddings for the plurality of users and the generated campaign user profile. For example, digital advertisement computing device 102 may employ a nearest neighbor algorithm, such as the approximate nearest neighbor algorithm identified by equation (4) above, to determine a subset of the plurality of users (i.e., candidate users).

To determine one or more items to be promoted to each candidate user, digital advertisement computing device 102 may generate user-item affinity scores. For example, the user-item affinity scores may be generated based on execution of an SVD algorithm (e.g., in accordance with equation (5) above) or SVD++ algorithm (e.g., in accordance with equation (6) above) operating on user transaction data 340. Digital advertisement computing device 102 may then determine a ranking of the promotional items to be advertised to each of the identified candidate users based on the user-item affinity scores. Digital advertisement computing device 102 may generate user item ad data 390 that identifies and characterizes the items to be promoted to each candidate user, and may transmit user item ad data 390 to web server 104. In some examples, digital advertisement computing device 102 transmits user item ad data 390 to store 109 when a candidate user is making a purchase, as identifying by in-store purchase data 302.

Figure 4A:
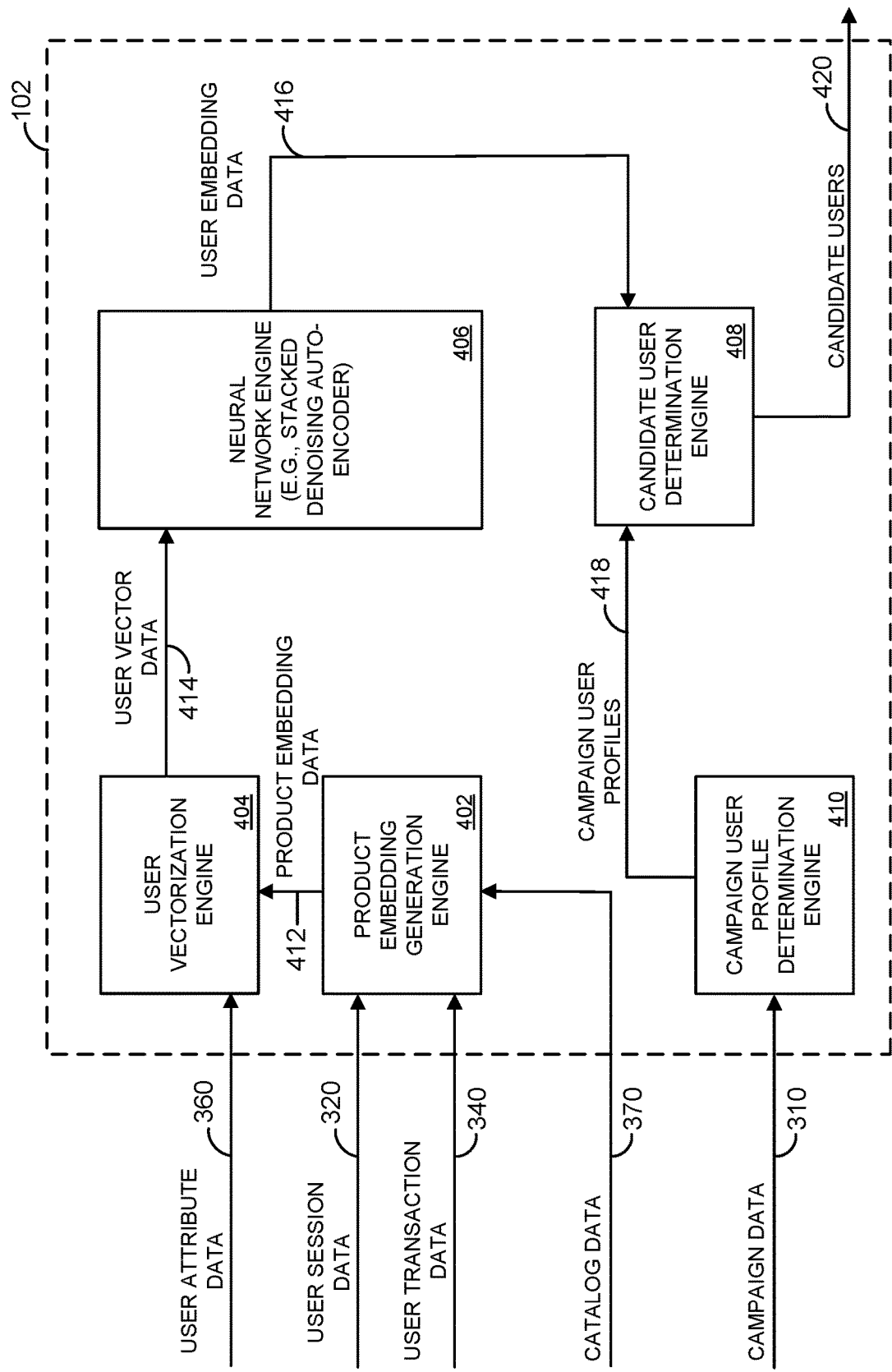
FIG. 4A is a block diagram illustrating examples of various portions of the digital advertisement computing device of FIG. 1 in accordance with some embodiments.
Figure 4B:
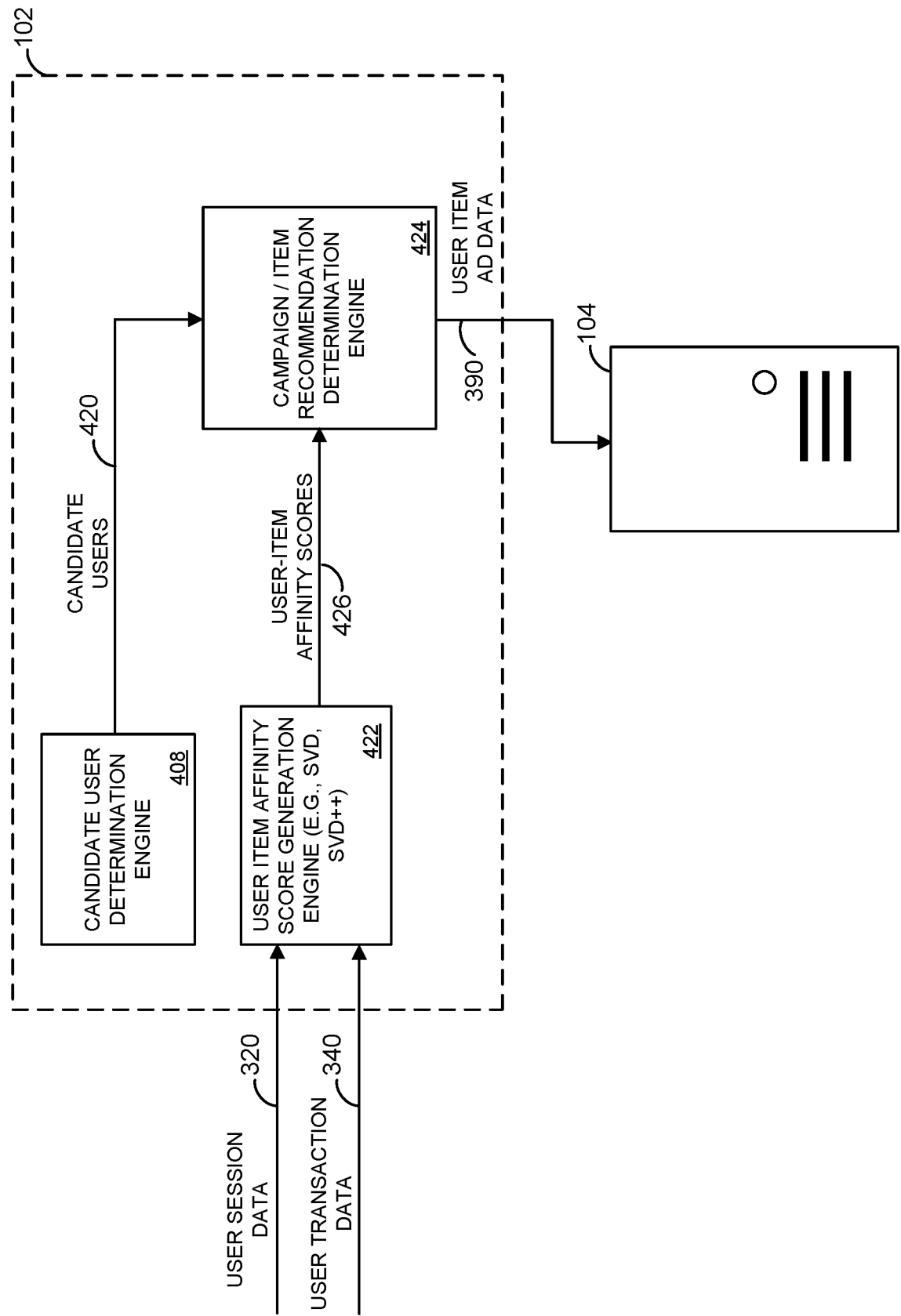
FIG. 4B is a block diagram illustrating examples of various portions of the digital advertisement computing device of FIG. 1 in accordance with some embodiments.

FIGS. 4A and 4B illustrate examples of various portions of the digital advertisement computing device 102 of FIG. 1.

As indicated in FIG. 4A, digital advertisement computing device 102 includes product embedding generation engine 402, user vectorization engine 404, neural network engine 406, candidate user determination engine 408, and campaign user profile determination engine 410. As illustrated in FIG. 4B, digital advertisement computing device 102 also includes user item affinity score generation engine 422 and campaign/item recommendation determination engine 424. In some examples, one or more of product embedding generation engine 402, user vectorization engine 404, neural network engine 406, candidate user determination engine 408, campaign user profile determination engine 410, user item affinity score generation engine 422, and campaign/item recommendation determination engine 424 may be implemented in hardware. In some examples, one or more of product embedding generation engine 402, user vectorization engine 404, neural network engine 406, candidate user determination engine 408, campaign user profile determination engine 410, user item affinity score generation engine 422, and campaign/item recommendation determination engine 424 may be implemented as an executable program maintained in a tangible, non-transitory memory, such as instruction memory 207 of FIG. 2, that may be executed by one or processors, such as processor 201 of FIG. 2.

Referring to FIG. 4A, product embedding generation engine 402 obtains user session data 320, user transaction data 340, and catalog data 370, and generates product embedding data 412 identifying and characterizing a product embedding vector. For example, product embedding generation engine 402 identifies items based on one or more of user session data 320 and user transaction data 340, and determines attributes for those items based on catalog data 370. Product embedding generation engine 402 may then generate a product embedding vector (e.g., a product embedding average vector), identified by product embedding data 412.

User vectorization engine 404 obtains product embedding data 412 and user attribute data 360, and generates user vector data 414, which identifies and characterizes user vectors for corresponding users. Neural network engine 406 obtains user vector data 414, applies a neural network to the user vector data 414 (e.g., such as a stacked denoising auto-encoder), and generates user embedding data 416 identifying and characterizing user embeddings for the corresponding users. User embedding data 416 is provided to candidate user determination engine 408.

Campaign user profile determination engine 410 obtains campaign data 310, such as from campaign server 110, and based on the campaign data 310, generates campaign user profiles 418. For example, campaign user profile 418 may identify and characterize a user that has purchased at least a portion of all promotional items for a campaign identified by campaign data 310. Campaign user profile determination engine 410 provides the campaign user profiles 418 to candidate user determination engine 408.

Candidate user determination engine 408 determines a set of candidate users 420 based on the user embeddings identified by user embedding data 416 and the campaign user profiles 418. For example, the candidate users 420 may identify a subset of the plurality of users corresponding to the user embeddings that are closest to a campaign user identified by campaign user profiles 418.

Referring to FIG. 4B, user item affinity score generation engine 422 obtains user session data 320 and user transaction data 340, for example, from database 116. Based on one or more of user session data 320 and user transaction data 340, user item affinity score generation engine 422 generates user-item affinity scores 426. For example, user item affinity score generation engine 422 may generate a user-item affinity score for items for each user as identified by user transaction data 340 based on execution of an SVD or SVD++ algorithm.

User item affinity score generation engine 422 provides the user item affinity scores 426 to campaign/item recommendation determination engine 424. Campaign/item recommendation determination engine 424 also obtains candidate users 420 from candidate user determination engine 408. Based on the user item affinity scores 426 and candidate users 420, campaign/item recommendation determination engine 424 determines user item ad data 390 that identifies and characterizes the items to be promoted to each candidate user. For example, user item ad data 390 may include a ranking of the items to be promoted for each candidate user. User item ad data 390 may be provided to, for example, web server 104, which may display advertisements and/or promotions for the identified items. In some examples, web server 104 displays the advertisements and/or promotions to each candidate user according to the item rankings.

Figure 5:
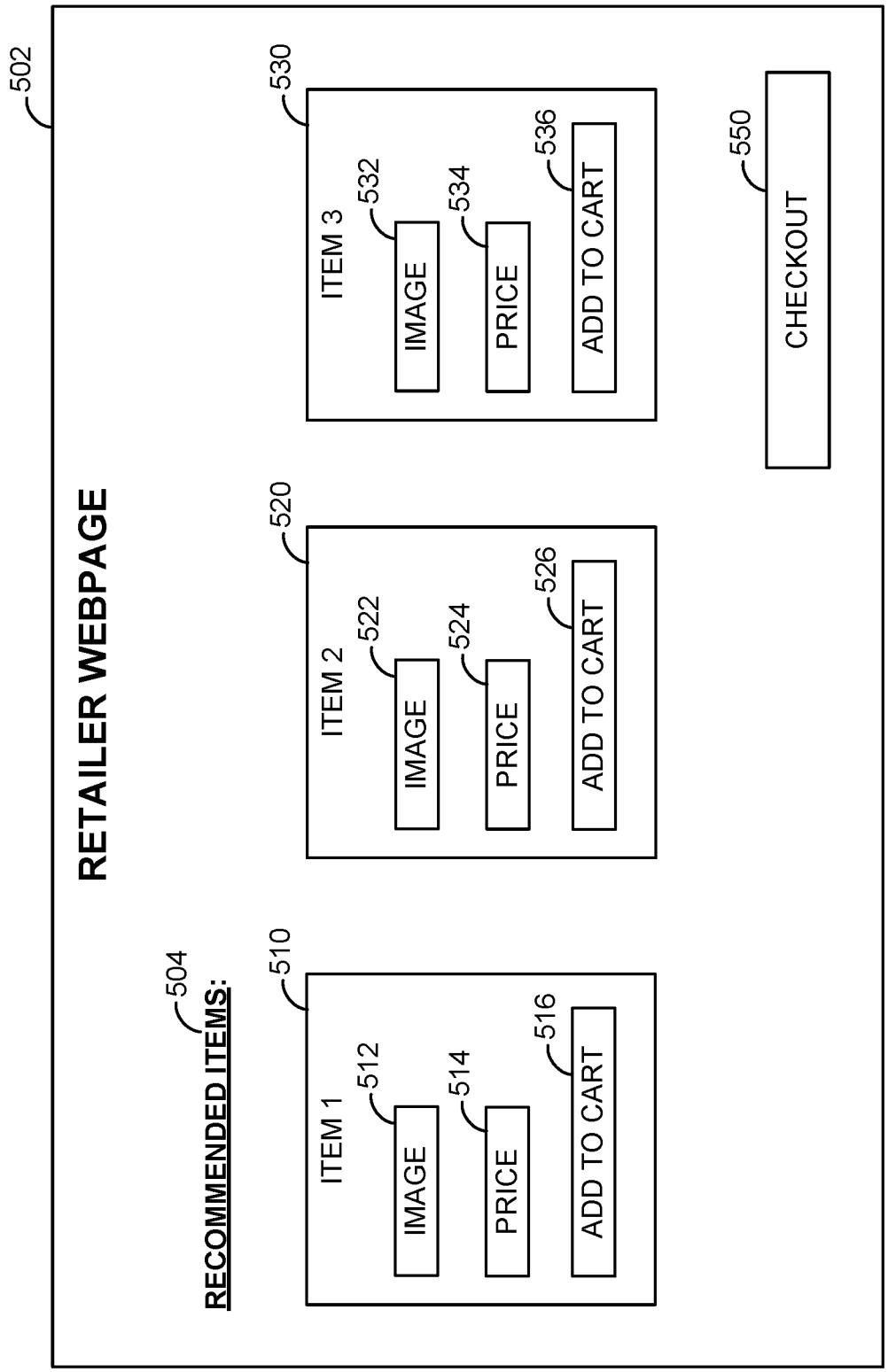
FIG. 5 is an example webpage displaying recommended items in accordance with some embodiments.

FIG. 5 illustrates an example retailer's webpage hosted by, for example, web server 104, that may display recommended items 504. For example, web server 104 may receive user item ad data 390 identifying one or more ranked items to promote. In this example, we assume that three items are ranked including first item 510, second item 520, and third item 530. For each ranked item, web server 104 may display one or more of an image of the item, a price for the item, and an add-to-cart icon that allows a user to add the item to an online shopping cart associated with retailer webpage 502. For example, as illustrated, first item 510 includes image 512, price 514, and add-to-cart icon 516. Similarly, second item 520 includes image 522, price 524, and add-to-cart icon 526. Third item 530 includes image 532, price 534, and add-to-cart icon 536. Retailer webpage 502 also includes checkout icon 550, which, when engaged (e.g., clicked on) by a user, facilitates the purchase of any items added to the online shopping cart.

Figure 6:
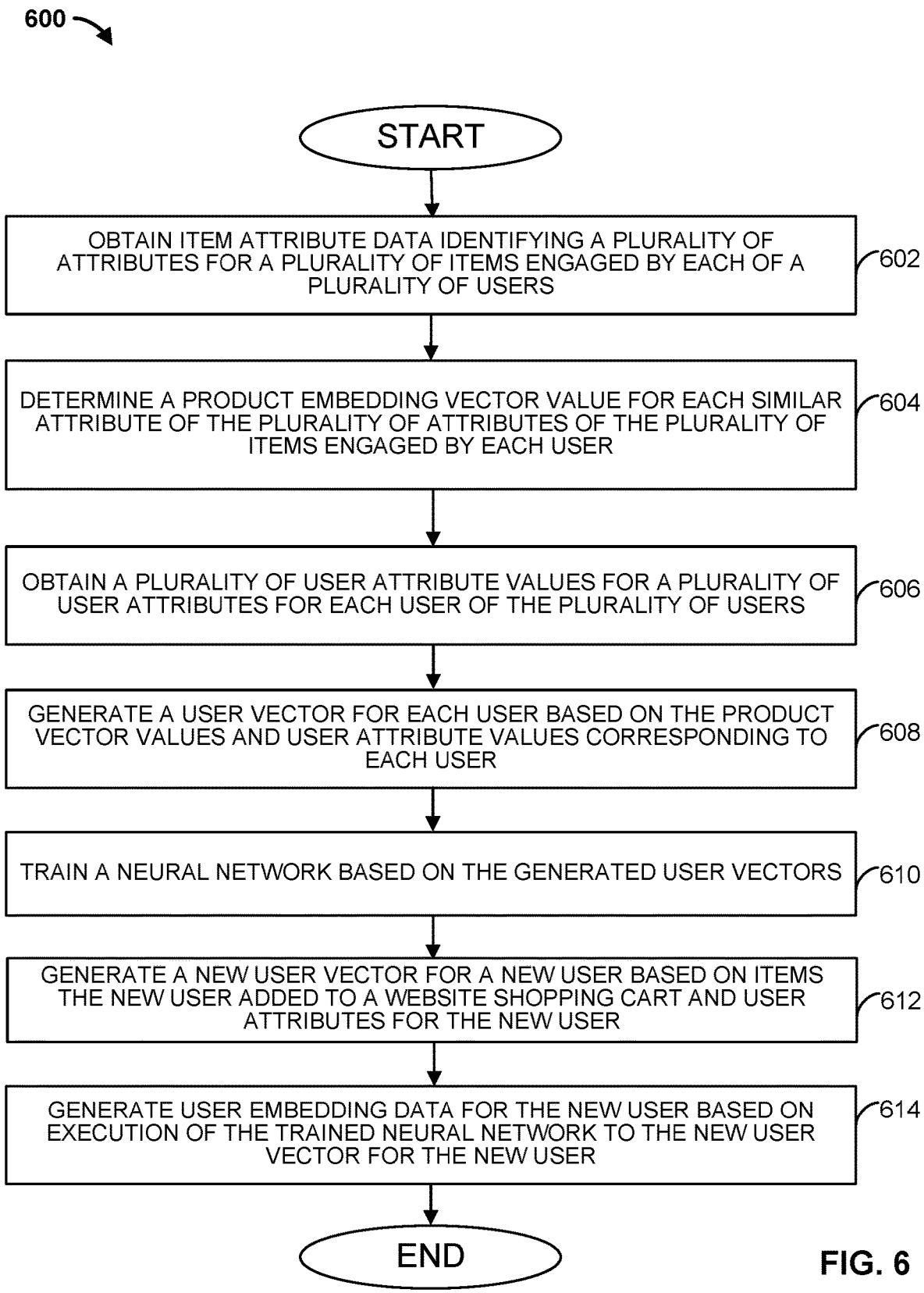
FIG. 6 is a flowchart of an example method that can be carried out by the digital advertisement identification system of FIG. 1 in accordance with some embodiments.

FIG. 6 is a flowchart of an example method 600 that can be carried out by the digital advertisement identification system 100 of FIG. 1. Beginning at step 602, a computing device, such as digital advertisement computing device 102, obtains item attribute data identifying a plurality of attributes for a plurality of items engaged by each of a plurality of users. For example, the item attribute data may identify, for each user, items that the user viewed or clicked on during a browsing session on a retailer's website. At step 604, a product embedding vector value is determined for each similar attribute of the plurality of attributes of the items associated with each user. The product embedding vector value is determined based on the plurality of attributes for the plurality of items engaged by each user. In some examples, the product embedding vector value is an average value for a particular attribute of the same attribute for the plurality of items engaged by the user.

Proceeding to step 606, a plurality of user attribute values for a plurality of user attributes are obtained for each user. For example, the user attribute values may represent an age, a gender, demographic information, contact information, or any other attribute of a user. At step 608, a user vector is generated for each user. Each user vector is generated based on the product vector values and the user attribute values corresponding to each user. For example, digital advertisement computing device 102 may concatenate a product vector that includes the product vector values with a user attribute vector that includes the user attribute values to generate the user vectors.

At step 610, a neural network, such as a stacked denoising auto-encoder, is trained based on the generated user vectors. For example, the training may be executed by minimizing a least squared loss between the input user vectors and the output of the neural network. At step 612, a new user vector for a new user is generated. The new user vector is generated based on items the new user added to a website shopping cart, and user attributes for the new user. For example, the user may be browsing a retailer's website, and may add items to an online shopping cart associated with the retailer's website. Proceeding to step 614, user embedding data is generated for the new user based on execution of the trained neural network to the new user vector for the new user. The generated user embedding data may be stored, for example, in database 116. The method then ends.

Figure 7:
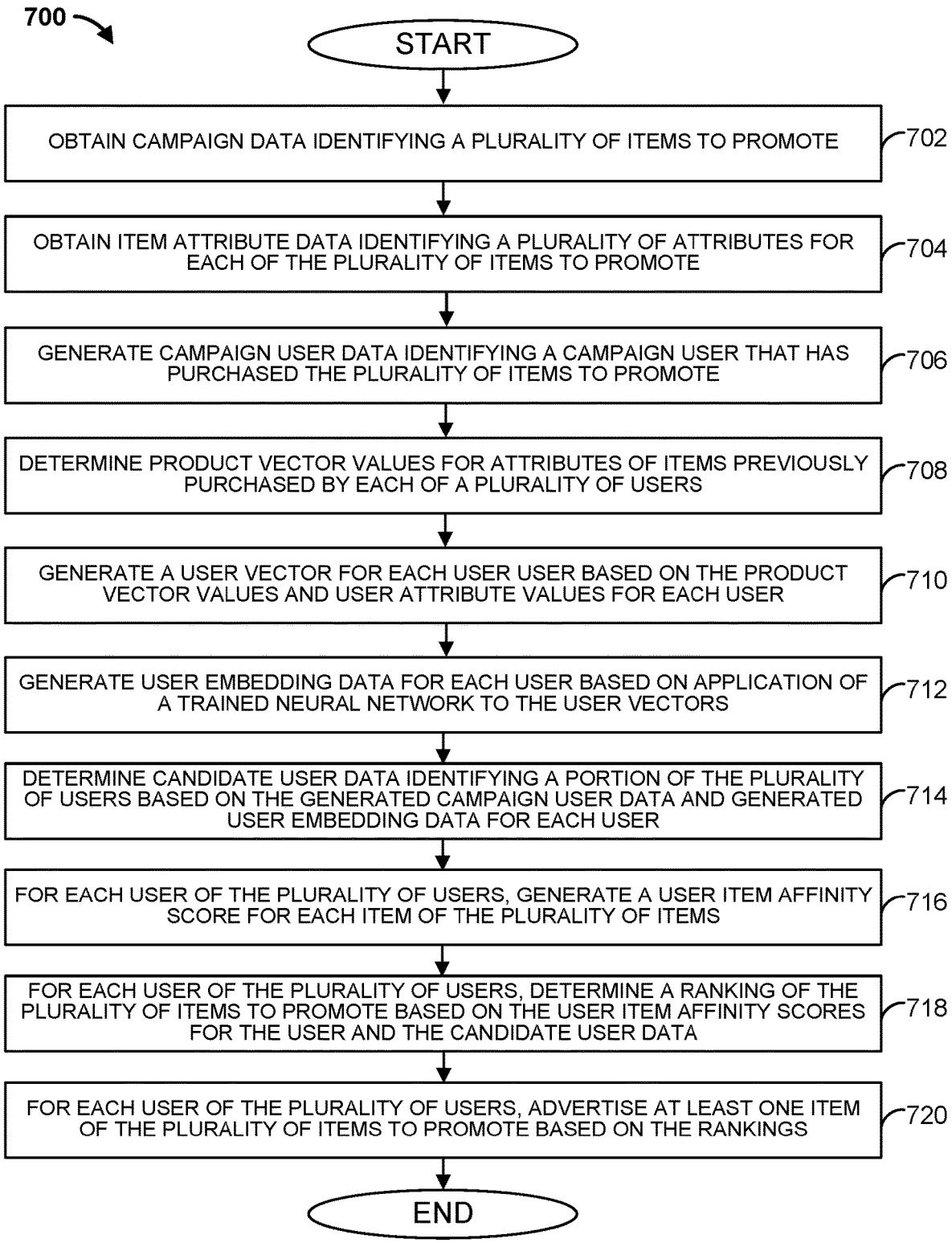
FIG. 7 is a flowchart of another example method that can be carried out by the digital advertisement identification system of FIG. 1 in accordance with some embodiments.

FIG. 7 is a flowchart of an example method 700 that can be carried out by the digital advertisement identification system 100 of FIG. 1. At step 702, a computing device, such as digital advertisement computing device 102, obtains campaign data identifying a plurality of items to promote. At step 704, item attribute data identifying a plurality of attributes for each of the plurality of items to promote is obtained. For example, item attribute data may identify a brand, a description, and an identification number of each of the plurality of items identified by the campaign data. At step 706, campaign user data is generated. The campaign user data identifies a campaign user that has purchased the plurality of items to promote.

Proceeding to step 708, product vector values are determined for attributes of items previously purchased by each of a plurality of users. For example, for each user, digital advertisement computing device 102 may obtain user transaction data 340 to determine one or more items previously purchased by the user. Digital advertisement computing device 102 may then obtain, for each previously purchased item, catalog data 370 identifying one or more attributes of each item. At step 710, a user vector is generated for each user based on the product vector values and user attribute values for each user. The user attribute values may be obtained, for example, from user attribute data 360 stored in database 116. At step 712, user embedding data is generated for each user based on the application of a trained neural network to the generated user vectors. The trained neural network may be, for example, a stacked denoising auto-encoder trained with user vectors.

Proceeding to step 714, candidate user data identifying a portion of the plurality of users is determined. The candidate user data may be determined based on the generated campaign user data and the generated user embedding data for each of the plurality of users. At step 716, a user-item affinity score is generated for each of the plurality of users. For example, the user-item affinity scores may be determined based on a recommender system, or based on a matrix decomposition method, such as SVD or SVD++. At step 718, for each user of the plurality of users, a ranking of the plurality of items to promote is determined for each user. Each ranking is based on the user item affinity scores for the user and the candidate user data identifying a portion of the plurality of users. Proceeding to step 720, for each user of the plurality of users, at least one item of the plurality of items to promote is advertised based on the rankings. For example, a website hosted by web server 104 may advertise to a user of the plurality of users the highest ranked item during a browsing session. The item may be advertised, for example, on a homepage of the website, or as a result of a search query. The method then ends.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
   a communications interface configured to communicate with a first server configured to communicate with a computing device of each user of a plurality of users of an online platform, and a second server;
   a memory resource storing instructions;
   one or more processors coupled to the communications interface and the memory resource, the one or more processors being configured to execute the instructions to:
   obtain, via the first server and for each user of the plurality of users, user session data of the plurality of users and user attribute data, the user session data of each user of the plurality of users identifying one or more instances the corresponding user engaged with one or more products via a computing device of the corresponding user;
   implement a first set of operations that generate user embedding data for each user of the plurality of users, the first set of operations including:
   for each user of the plurality of users, generating a product embedding for each of the one or more products identified in the corresponding user session data, the product embedding of a product of the one or more products identifying at least one attribute of the corresponding product;
   for each user of the plurality of users, generating a product embedding average vector, wherein each element of the product embedding average vector identifies an average value for a corresponding attribute of one or more similar attributes by averaging attribute values of the corresponding attribute of product embeddings of the one or more products;
   for each user of the plurality of users, generating user vector data by combining the product embedding average vector with user attribute data;
   for each user of the plurality of users, generating user embedding data by applying a neural network to the user vector data, wherein the neural network is a stacked denoising auto-encoder;
   receive, from the second server, campaign data identifying a set of products;
   based at least on the generated product embedding for each of the one or more products associated with each user of the plurality of users, and one or more assigned attributes of a campaign user, implement a second set of operations that generate a campaign user profile, the second set of operations including:
   based at least on the generated product embedding for each of the one or more products associated with each user of the plurality of users and for each product of the set of products, identifying one or more product embeddings;
   determining a campaign product embedding average vector, wherein each element of the campaign product embedding average vector identifies an average value for a respective attribute of one or more similar attributes by averaging attribute values of the respective attribute of the one or more corresponding product embeddings of the set of products;
   generating a campaign user profile by combining the campaign product embedding average vector with the one or more assigned attributes of the campaign user;
   determine a portion of the plurality of users based on application of a nearest neighbor algorithm to the campaign user profile and the user embedding data of each user of the plurality of users;
   for each user of the portion of the plurality of users, determine user-item values for each product of the set of products, wherein each user-item value identifies a relational value between the corresponding user and product;
   determine at least one product of the set of products for each user of the portion of the plurality of users based on the user-item values; and
   transmit, via the first server and to the computing device of each user of the portion of the plurality of users, an indication of the at least one product of the set of products for each user of the portion of the plurality of users.

2. The system of claim 1, wherein execution of the instructions, by the one or more processors, further causes the one or more processors to:
   receive session data identifying engagement of a second set of products for each of the plurality of users;
   determine at least one attribute value for at least one attribute of the second set of products for each of the plurality of users;
   generate user representation data for each user of the plurality of users based on application of the neural network to the at least one attribute value and the user attribute data corresponding to each user of the plurality of users; and determine the portion of the plurality of users based on the user representation data.

3. The system of claim 2 wherein execution of the instructions, by the one or more processors, further causes the one or more processors to:

determine one or more common attributes of the second set of products for each of the plurality of users; and determine the at least one attribute value for the at least one attribute of the second set of products for each of the plurality of users based on the one or more common attributes.

4. The system of claim 3, wherein attribute values for each of the one or more common attributes of the second set of products for each of the plurality of users are averaged.

5. The system of claim 1, wherein the nearest neighbor algorithm is an approximate nearest neighbor algorithm.

6. The system of claim 1, wherein determining the user-item values is based on application of a matrix decomposition algorithm.

7. The system of claim 1, wherein determining the user-item values is based on application of a recommender system.

8. The system of claim 1, wherein the computing device is configured to:

determine a ranking of the set of products for each user of the portion of the plurality of users based on the user-item values corresponding to each user; and determine a minimum number of items to advertise to each user of the portion of the plurality of users based on the set of products ranked highest.

9. The system of claim 1 comprising:

a second computing device configured to:

receive the indication of the at least one of the set of products for each user of the portion of the plurality of users;

determine that a user of the portion of the plurality of users is browsing a website; and cause a display of an image of the at least one of the set of products for the user on the website.

10. A computer-implemented method comprising:

for each user of a plurality of users, obtaining, via a first server and by a processor, user session data of the plurality of users of an online platform, the user session data of each user of the plurality of users identifying one or more instances the corresponding user engaged with one or more products via a computing device of the corresponding user;

implementing a first set of operations that generate user embedding data for each user of the plurality of users, the first set of operations including:

for each user of the plurality of users, generating a product embedding for each of the one or more products identified in the corresponding user session data, the product embedding of a product of the one or more products identifying at least one attribute of the corresponding product;

for each user of the plurality of users, generating a product embedding average vector, wherein each element of the product embedding average vector identifies an average value for a corresponding attribute of one or more similar attributes by averaging attribute values of the corresponding attribute of product embeddings of the one or more products;

for each user of the plurality of users, generating user vector data by combining the product embedding average vector with user attribute data;

for each user of the plurality of users, generating user embedding data by applying a neural network to the user vector data, wherein the neural network is a stacked denoising auto-encoder;

receive, from a second server, campaign data identifying a set of products;

based at least on the generated product embedding for each of the one or more products associated with each user of the plurality of users, and one or more assigned attributes of a campaign user, implement a second set of operations that generate a campaign user profile, the second set of operations including:

based at least on the generated product embedding for each of the one or more products associated with each user of the plurality of users and for each product of the set of products, identify one or more product embeddings; and determining a campaign product embedding average vector, wherein each element of the campaign product embedding average vector identifies an average value for a respective attribute of one or more similar attributes by averaging attribute values of the respective attribute of the one or more corresponding product embeddings of the set of products;

generating a campaign user profile by combining the campaign product embedding average vector with the one or more assigned attributes of the campaign user;

determining, by the processor, a portion of the plurality of users based on application of a nearest neighbor algorithm to the campaign user profile and the user embedding data of each user of the plurality of users;

for each user of the portion of the plurality of users, determining, by the processor, user-item values for each product of the set of products, wherein each user-item value identifies a relational value between the corresponding user and product;

determining, by the processor, at least one product of the set of products for each user of the portion of the plurality of users based on the user-item value; and transmitting, by the processor and to a computing device of each user of the portion of the plurality of users via the first server, an indication of the at least one product of the set of products for each user of the portion of the plurality of users.

11. The computer-implemented method of claim 10 comprising:

receiving session data identifying engagement of a second set of products for the plurality of users;

determining at least one attribute value for at least one attribute of the second set of products for each of the plurality of users;

generating user representation data for each user of the plurality of users based on application of the neural network to the at least one attribute value and the user attribute data corresponding to each user of the plurality of users; and determining the portion of the plurality of users based on the user representation data.

12. The computer-implemented method of claim 11 further comprising:

determining a common attribute of the second set of products for each of the plurality of users; and determining the at least one attribute value for the at least one attribute of the second set of products for each of the plurality of users based on the common attribute.

13. The computer-implemented method of claim 10 further comprising determining the user-item values based on application of a matrix decomposition algorithm.

14. The computer-implemented method of claim 10 further comprising:
   determining a ranking of the set of products for each user of the portion of the plurality of users based on the user-item values corresponding to each user; and
   determining a minimum number of items to advertise to each user of the portion of the plurality of users based on the set of products ranked highest.

15. A non-transitory computer readable medium having instructions stored thereon, wherein the instructions, when executed by at least one processor, cause a device to perform operations comprising:
   for each user of a plurality of users, obtaining, via a first server, user session data of the plurality of users of an online platform, the user session data of each user of the plurality of users identifying one or more instances the corresponding user engaged with one or more products via a computing device of the corresponding user;
   implementing a first set of operations that generate user embedding data for each user of the plurality of users, the first set of operations including:
      for each user of the plurality of users, generating a product embedding for each of the one or more products identified in the corresponding user session data, the product embedding of a product of the one or more products identifying at least one attribute of the corresponding product;
      for each user of the plurality of users, generating a product embedding average vector, wherein each element of the product embedding average vector identifies an average value for a corresponding attribute of one or more similar attributes by averaging attribute values of the corresponding attribute of product embeddings of the one or more products;
      for each user of the plurality of users, generating user vector data by combining the product embedding average vector with user attribute data;
      for each user of the plurality of users, generating user embedding data by applying a neural network to the user vector data, wherein the neural network is a stacked denoising auto-encoder;
   receive, from a second server, campaign data identifying a set of products;
   based at least on the generated product embedding for each of the one or more products associated with each user of the plurality of users, and one or more assigned attributes of a campaign user, implement a second set of operations that generate a campaign user profile, the second set of operations including:
      based at least on the generated product embedding for each of the one or more products associated with each user of the plurality of users and for each product of the set of products, identify one or more product embeddings; and
      determining a campaign product embedding average vector, wherein each element of the campaign product embedding average vector identifies an average value for a respective attribute of one or more similar attributes by averaging attribute values of the respective attribute of the one or more corresponding product embeddings of the set of products;
   generating a campaign user profile by combining the campaign product embedding average vector with the one or more assigned attributes of the campaign user;
   determining a portion of the plurality of users based on application of a nearest neighbor algorithm to the campaign user profile and the user embedding data of each user of the plurality of users;
   for each user of the portion of the plurality of users, determining user-item values for each product of the set of products, wherein each user-item value identifies a relational value between the corresponding user and product;
   determining at least one product of the set of products for each user of the portion of the plurality of users based on the user-item values; and
   transmitting, via the first server to a computing device of each user of the portion of the plurality of users, an indication of the at least one product of the set of products for each user of the portion of the plurality of users.

16. The non-transitory computer readable medium of claim 15 further comprising instructions stored thereon that, when executed by the at least one processor, further cause the device to perform operations comprising:
   receiving session data identifying engagement of a second set of products for the plurality of users;
   determining at least one attribute value for at least one attribute of the second set of products for each of the plurality of users;
   generating user representation data for each user of the plurality of users based on application of the neural network to the at least one attribute value and the user attribute data corresponding to each user of the plurality of users; and
   determining the portion of the plurality of users based on the user representation data.

17. The non-transitory computer readable medium of claim 16 further comprising instructions stored thereon that, when executed by the at least one processor, further cause the device to perform operations comprising:
   determining a common attribute of the second set of products for each of the plurality of users; and
   determining the at least one attribute value for the at least one attribute of the second set of products for each of the plurality of users based on the common attribute.

18. The non-transitory computer readable medium of claim 15 further comprising instructions stored thereon that, when executed by the at least one processor, further cause the device to perform operations comprising determining the user-item values based on application of a matrix decomposition algorithm.

19. The non-transitory computer readable medium of claim 15 further comprising instructions stored thereon that, when executed by the at least one processor, further cause the device to perform operations comprising:
   determining a ranking of the set of products for each user of the portion of the plurality of users based on the user-item values corresponding to each user; and
   determining a minimum number of items to advertise to each user of the portion of the plurality of users based on the set of products ranked highest.

* * * * *